No. 820,613. PATENTED MAY 15, 1906.
B. C. WHITE.
LADLE.
APPLICATION FILED AUG. 12, 1905.
2 SHEETS—SHEET 1.
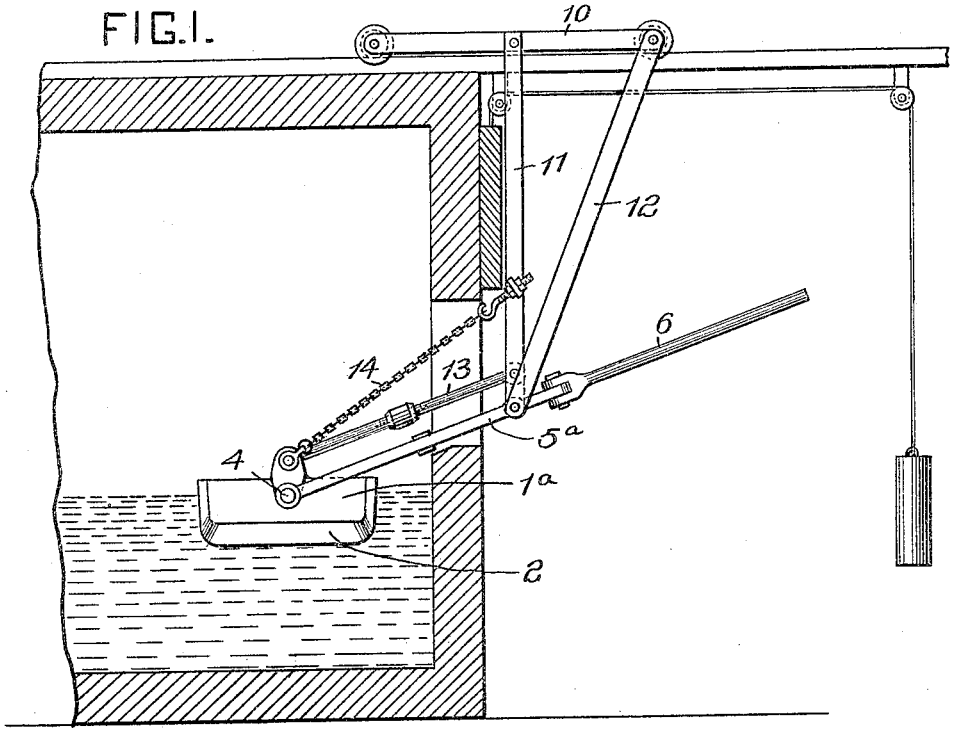
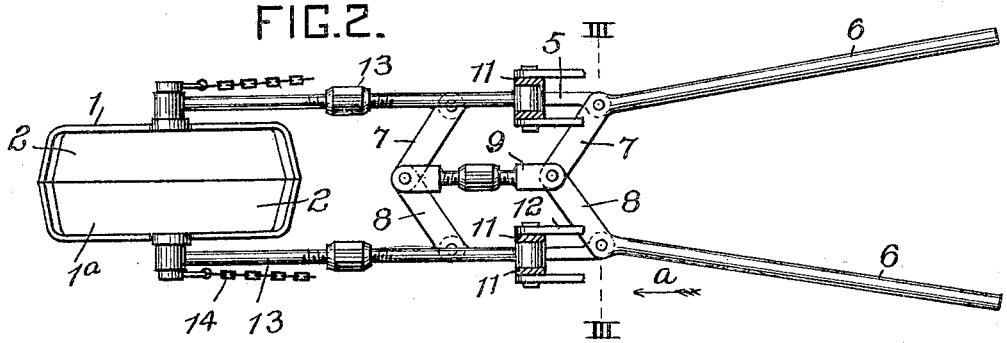
WITNESSES:
Herbert Bradley.
Francis Vernau
INVENTOR
Bruce Clark White,
by Christy and Christy,
Atty's.

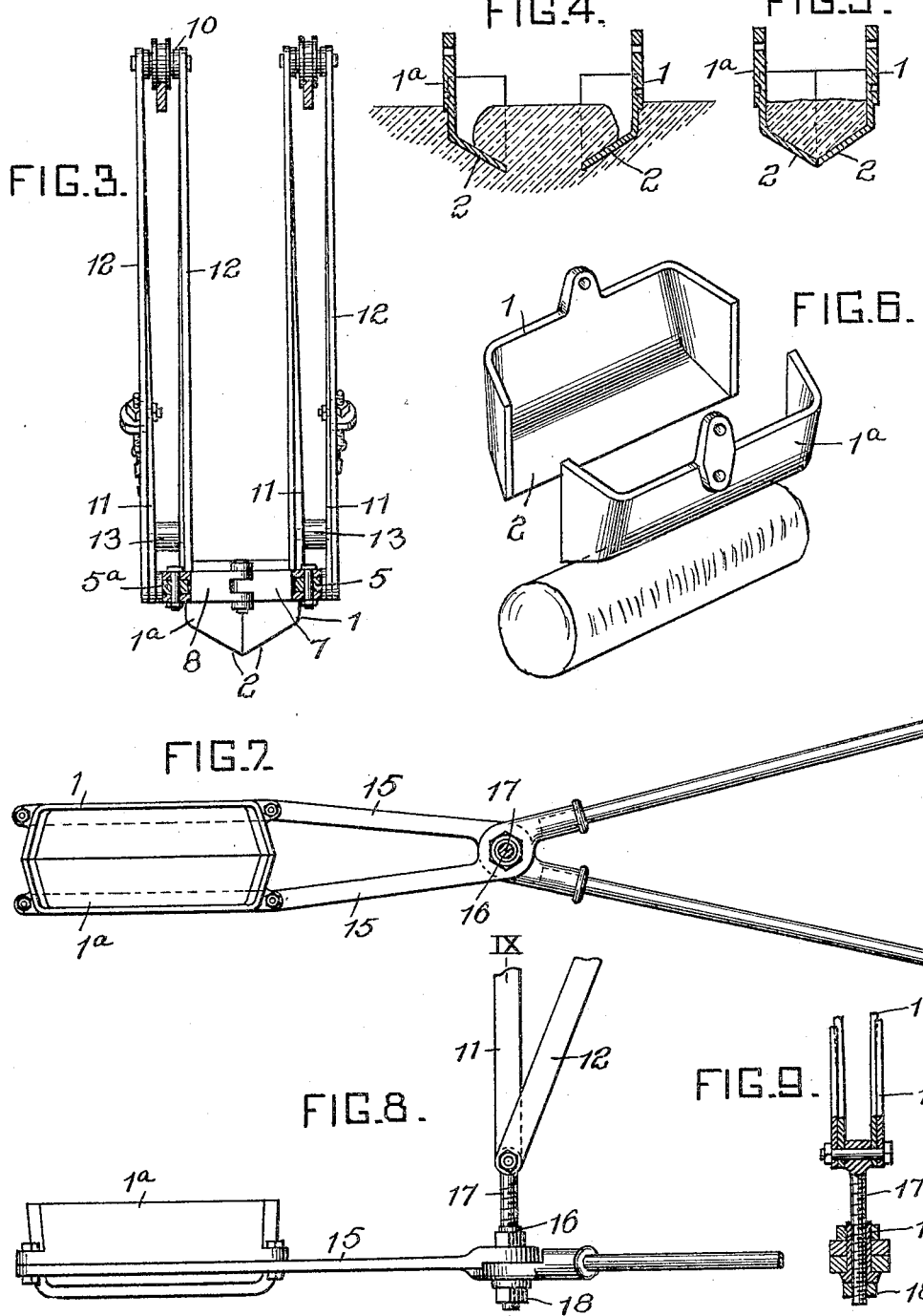

UNITED STATES PATENT OFFICE.

BRUCE CLARK WHITE, OF MOSGROVE, PENNSYLVANIA.

LADLE.

No. 820,613.  Specification of Letters Patent.  Patented May 15, 1906.

Application filed August 12, 1905. Serial No. 273,952.

*To all whom it may concern:*

Be it known that I, BRUCE CLARK WHITE, a citizen of the United States, residing at Mosgrove, in the county of Armstrong and State of Pennsylvania, have invented or discovered certain new and useful Improvements in Ladles, of which improvements the following is a specification.

The invention described herein relates to certain improvements in ladles for removing metal, such as glass, from the furnace and transferring it to a shaping mechanism, either a mold, rolls, or other suitable means.

The invention has for its object a construction wherein the metal may be scooped from the surface without immersing the ladle to a depth greater than the height of metal required in the ladle for the amount to be removed.

It is well known to those skilled in the art of manufacturing glass that in a body of molten glass the temperature decreases proportionately toward the bottom or lower portion of such body of glass and that the glass most suitable for use in forming articles such as glass sheets is found practically on or near the surface, extending to a depth of three, four, or five inches. In removing a portion of the glass by the ordinary ladle it is necessary to immerse a portion at least thereof below the depth to which the best glass extends, and hence glass of an inferior quality will be taken up in the ladle.

The invention described herein consists, generally stated, in providing a ladle formed in sections which can be separated one from the other and after being immersed to a depth not greater than the height of glass required in the ladle for the quantity to be removed can be closed together, whereby only such glass as is to be removed will be disturbed in the ladling operation. The invention is hereinafter more fully described and claimed.

In the accompanying drawings, forming a part of this specification, Figure 1 is a view showing in section a portion of a glass-tank and in elevation my improved ladle and its supporting and operating means. Fig. 2 is a plan view of the ladle, the ladle-support being removed. Fig. 3 is a sectional view on a line indicated by the line III III, Fig. 2, looking in the direction of the arrow *a*. Figs. 4, 5, and 6 are detail views illustrating the manner of collecting glass with my improved ladle and also showing the shape imparted to the body of glass collected by the walls of the ladle. Fig. 7 is a view similar to Fig. 2, illustrating a modified form of the ladle. Fig. 8 is a view in side elevation of the construction shown in Fig. 7, and Fig. 9 is a sectional detail view on a line indicated by the line IX IX, Fig. 8.

In the practice of my invention the body of the ladle is formed by two trough-like sections 1 and 1$^a$, preferably having inclined bottom walls 2, said walls, if desired, being given, as regards their inner surfaces, a slight curvature. In the construction shown in Figs. 1, 2, and 3 the sections of the ladle are provided with trunnions 4, which are mounted in suitable bearings in arms 5 5$^a$, provided at their rear ends with operating-handles 6. In order that the sections of the ladle may open with parallel movements or be maintained in parallelism in all positions, the arms 5 and 5$^a$ are connected together by two or more pairs of links 7 and 8, the links of each pair being pivoted together and having their outer ends pivoted to the arms 5 and 5$^a$. The pairs of links are connected to each other, preferably at their pivotal connection, by a bar 9, preferably adjustable, so that in opening and closing movements these pairs of links will move in unison. By this construction the sections of the ladle will be maintained at all times parallel to each other, While any suitable means may be employed for supporting the ladle while being moved into and out of the furnace, it is preferred to employ a trolley 10, mounted on a track extending from the furnace to the point at which the ladle is to be discharged. Rods 11 extend from the trolley and have their lower ends pivotally connected to the arms 5 and 5$^a$, carrying the ladle.

In order to prevent a swinging of the ladle on its support, braces 12 also extend from the trolley to the pivotal connections of the rods 11 with the arms 5 and 5$^a$. In order that the ladle-sections may be always maintained in a horizontal position, braces 13 extend from the rods 11 and are pivotally connected to the ladle-sections at points above the trunnions. It is preferred that this brace or connection 13 should be adjustable as regards its length. By this construction the ladle can be shifted up and down on the pivotal connections of the arms 5 5$^a$ with the supporting-rod 11 and will be always maintained in a horizontal position by the brace 13. While not necessary, it is preferred to employ suitable means to prevent the ladle from being immersed too deeply in the glass. A suitable means to this end consists of a flexible connection 14 from the supporting-rods to the ladle, as shown in Fig. 1, such stop connection being adjustable. When using this construction, the ladle is thrust through the door of the furnace and then swung down, the sections being separated, until the lower edges of the sections are immersed to the desired depth in the glass. The sections are then closed and the ladle raised and withdrawn from the furnace.

It is characteristic of the operation of my improved ladle that in scooping up a quantity of glass the latter is given a certain shape which will facilitate a subsequent shaping of the glass, as by rolling, as described in an application, Serial No. 273,951, filed of even date herewith.

While it is preferred to so support the ladle-sections, so that they will be parallel, or approximately so, in opening and closing, the sections may be secured to arms 15, pivotally connected together by a pin 16. This pin is preferably made hollow to permit of the insertion through it of the supporting-rod 17, which is connected by rods 11 and braces 12 to a supporting-trolley, as heretofore described. The rod 17 passes loosely through the hollow pin and is threaded for the reception of the ladle-supporting nut 18, which serves as a bearing when the ladle is swung horizontally around the rod 17, as shown in Figs. 7, 8, and 9.

I claim herein as my invention—

1. A ladle having in combination two trough-like sections, means for moving said sections toward and from each other and means for holding the sections in a horizontal position.

2. A ladle having in combination two trough-like sections, arms having a pivotal connection to the sections and having a pivotal connection to a support and means for limiting the movement of the arms and ladle-sections on its connection with the support.

3. A ladle having in combination two trough-like sections, arms having pivotal connections to the sections, a trolley, connections from the trolley pivotally connected to the arms, and a brace extending from the trolley connection to a point on the ladle outside of its pivotal connection to the arms.

4. A ladle having in combination two trough-like sections, arms pivotally connected to the sections, pivotally-connected links having pivotal connections to the arms, and an adjustable connection between the pivot-pins of the links.

In testimony whereof I have hereunto set my hand.

BRUCE CLARK WHITE.

Witnesses:
MINNIE C. JONES,
FRANCIS VERNAN.